INVENTOR
JOACHIM AMSLER

BY Wenderoth, Lind & Ponack
ATTORNEYS

April 11, 1967     J. AMSLER     3,313,707
APPARATUS FOR COMPRESSING AND HEATING A PLASMA
CONTAINING A FUSIONABLE MATERIAL
Filed April 17, 1964
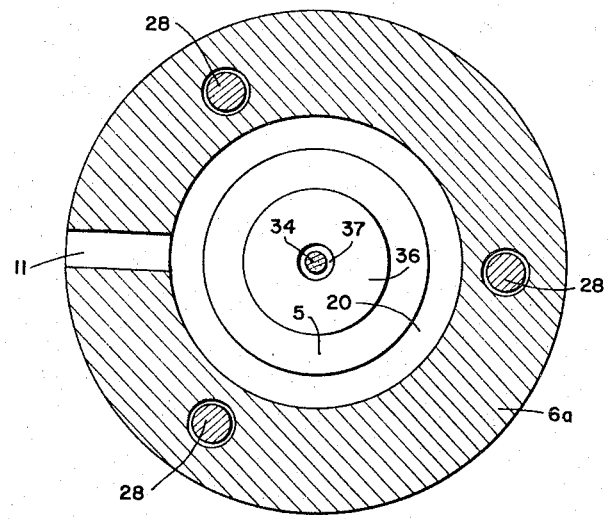
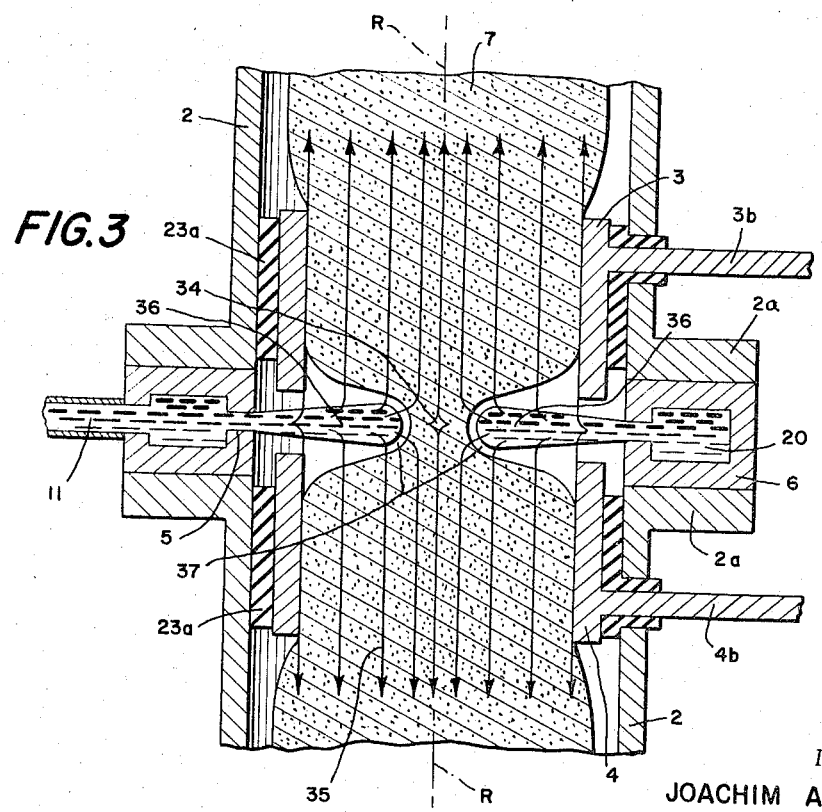
INVENTOR
JOACHIM AMSLER
BY Wenderoth, Lind & Ponack
ATTORNEYS

INVENTOR
JOACHIM AMSLER

United States Patent Office 3,313,707
Patented Apr. 11, 1967

3,313,707
APPARATUS FOR COMPRESSING AND HEATING A PLASMA CONTAINING A FUSIONABLE MATERIAL
Joachim Amsler, 312 Hohenweg, Unterentfelden, Aargau, Switzerland
Filed Apr. 17, 1964, Ser. No. 360,620
Claims priority, application Switzerland, May 4, 1959, 72,862/59; Apr. 6, 1960, 3,868/60
5 Claims. (Cl. 176—8)

This application is a continuation-in-part of my application U.S. Ser. No. 26,357, filed May 2, 1960, now abandoned.

The present invention relates to an apparatus for compressing and heating a plasma which contains a fusionable material, and to a method carried out by the use of this apparatus.

It is known that the radiant energy emitted by the fixed stars is due to the energy which is released in fusing lighter nuclei to heavier nuclei, particularly in the production of helium from hydrogen. Such fusion reactions occur because of the extraordinary conditions prevailing in the interior of such stars, for example at temperatures $10^7$ to $10^8$ degrees K. and at high particle densities which may exceed $10^{25}$ particles per cubic meter.

For a number of years, intensive tests have been made in an effort to produce conditions on earth under which nuclear fusion of deuterium can take place on a sufficiently large scale to produce a net gain in energy. If this can be done, the problem of supplying the energy needs of mankind will be solved for a practically unlimited period of time, since the supply of deuterium exists in practically inexhaustible quantities.

All of these tests have been conducted in an effort to enclose a limited amount of deuterium containing plasma by means of intense magnetic fields and to heat the plasma to the high temperature required for initiating the fusion reaction. The technical difficulties which have arisen during these tests have not heretofore been overcome.

It is an object of the present invention to provide a method and an apparatus for carrying out said method for compressing and heating a plasma in order to obtain high temperatures and particle densities such as are required for the production of energy by thermonuclear fusion reactions.

The method according to the invention comprises forming a plasma column by establishing an arc between two spaced electrodes positioned within a container, then cooling the plasma column over a portion of the length thereof by feeding a working medium containing a fusionable material along the whole periphery of said portion of the plasma column. The working medium is fed in a direction which is substantially radial to the plasma column, which direction is parallel to a plane extending at right angles to the axis of the plasma column, so that the working medium, after it has exerted its cooling action, discharges symmetrically toward the electrodes.

The apparatus for carrying out the method comprises a pressure resistant expansion chamber which has two spaced electrodes in it, which electrodes are electrically insulated from the wall of the chamber. A source of electric power is connected across said electrodes so that an electrical arc can be established and maintained between said electrodes. In a medial plane which extends perpendicularly to the axis between said electrodes is an annular member which surrounds only a part of the length of the axis, which annular member is of substantially rotational symmetry with respect to the axis and which is of substantially mirror symmetry with respect to said medial plane. The annular member has an annular inlet opening on the internal periphery thereof through which a working medium can be introduced. The working medium is caused to flow out of the opposite ends of the annular member into the chamber in mirror symmetrical fashion with respect to the medial plane. The chamber has at least one outlet opening therefrom through which the working medium can flow out of the chamber.

Other and further objects of the invention will be clear from the following specification and claims, taken together with the accompanying drawings, in which:

FIG. 2 is a sectional view taken on line 2—2 of FIG. 1;

FIG. 3 is a view similar to that of FIG. 1 showing a part of a simplified embodiment of the apparatus and illustrating the flow of cooling medium during the operation of the apparatus.

Figure 1:
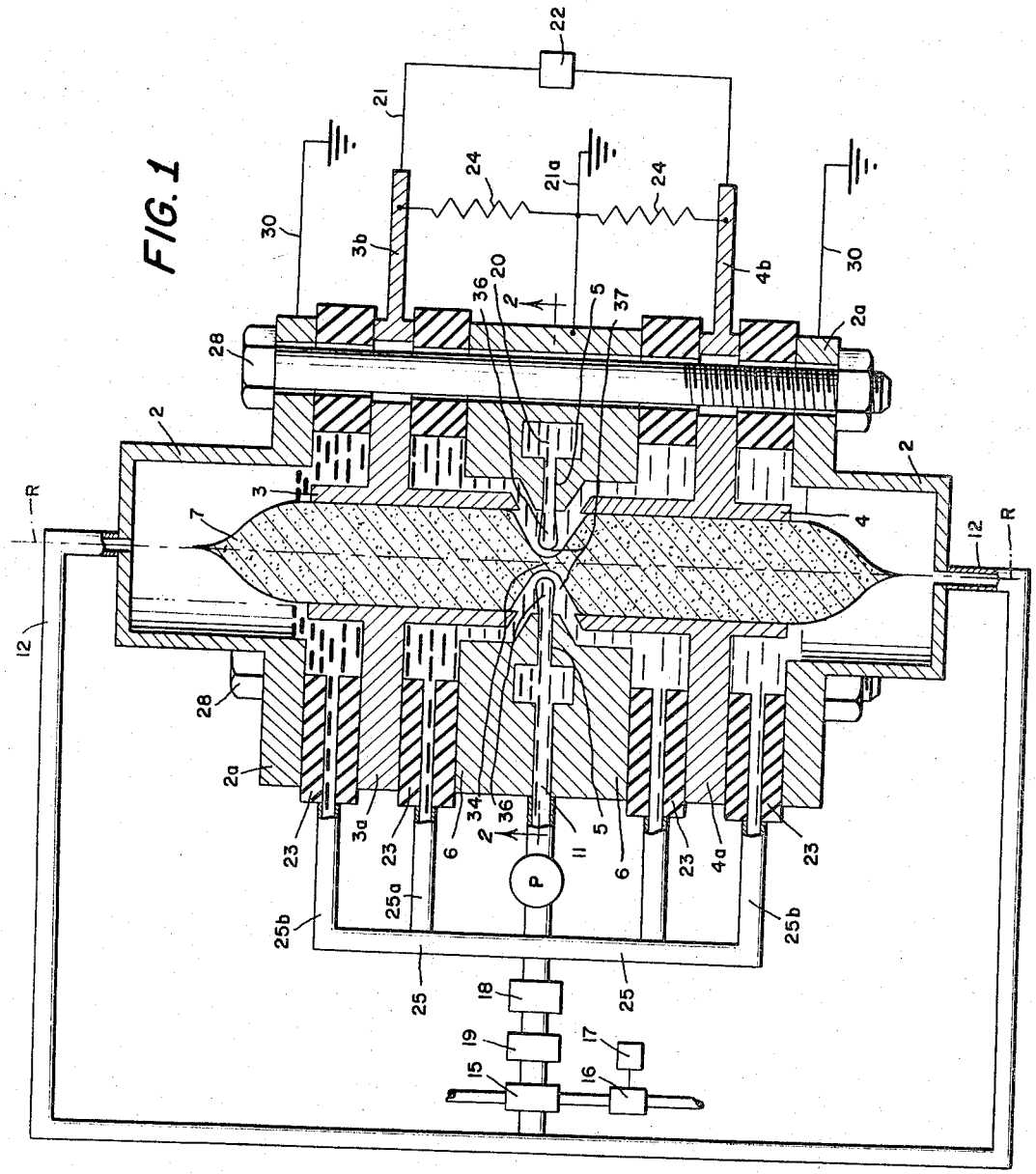
FIG. 1 is an axial sectional view of the expansion chamber of the apparatus of the present invention with the parts outside of the expansion chamber shown schematically.

As seen in FIGS. 1 and 2, the apparatus according to the invention comprises a pressure resistant chamber 2 which can have the internal pressure thereof raised above atmospheric pressure. Mounted within the chamber 2 are two spaced electrodes 3 and 4, which in the embodiment disclosed are annular cylindrical electrodes. The electrodes 3 and 4 are made of materials normally used for electrodes, such as copper, tungsten, molybdenum, and the like, and combinations of these materials.

Connected to the electrodes 3 and 4 are means for establishing and maintaining an electrical arc between the electrodes, which in the present embodiment comprise a source of power, for example a direct current homopolar generator, or a three-phase current generator with current rectifiers. Conductors 21 extend from the source of power 22 to contacts 3b and 4b on annular extensions 3a and 4a of the electrodes 3 and 4. The annular extensions 3a and 4a are held between annular insulating rings 23 forming part of the wall of the chamber 2 and which can be of insulating materials such as mica, quartz, porecelain, and the like. This source of power 22 should be capable of producing a voltage drop across the electrodes 3 and 4 of at least 2000 volts, and it is desirable that it have a current capacity on the order of 100,000 amperes.

The chamber 2 is symmetrically divided into two halves which are symmetrical with respect to a medial plane corresponding to the section line 2—2 and which is perpendicular to the axis R—R between the electrodes 3 and 4. Between the two closest electrical insulating rings 23 is an annular member 6, the annular member is made of a material which is electrically conducting and has a high mechanical resistance and which is furthermore resistant to all types of radiation, e.g. gamma radiation, corpuscular radiation such as neutron radiation, etc. Stainless steel is a preferred material. The annular member surrounds only a part of the length of the axis R—R between the electrodes 3 and 4. The annular member 6 is likewise substantially mirror symmetrical with respect to the plane corresponding to section line 2—2.

It will thus be seen that the electrodes 3 and 4 are insulated from each other and from the chamber walls and from the annular member 6, and the walls of the chamber halves are insulated from each other, from the annular member 6, and from the electrodes. Within the annular member 6 is an annular chamber 20, and opening radially inwardly from the chamber 20 is an annular nozzle 5 at the minimum diameter of the axial opening through the annular member and at the point where the perpendicular plane intersects the axis R—R. From this point toward the opposite ends of the chamber 2 the inner surface of the annular member 6 diverges toward the opposite ends of the chamber, so that the axial opening through the annular member is constricted at the plane corresponding to the section line 2—2.

Extending into the chamber 20 inwardly through the annular member 6 is a passage 11 which is symmetrical on opposite sides of the plane corresponding to the section line 2—2. The passageway 11 is connected to a pump P which pumps a working medium through passageway 11 into annular chamber 20. Branching off the pump intake conduit in a direction parallel to the axis R—R are oppositely directed conduits 25 from which branch conduits 25a extend through the insulators 23 forming part of the chamber walls into the annular spaces around electrodes 3 and 4 respectively and between annular extensions 3a and 4a and annular member 6. Branch conduits 25b extend from conduits 25 through the insulating rings 23 into the interior of the chamber in the space around electrodes 3 and 4 and between extensions 3a and 4a and the ends of the chamber 2. Bolts 28 are spaced equidistantly around the chamber and extend through flanges 2a on the chamber 2 and the insulating rings 23, the annular extensions 3a and 4a, and the annular member 6 to hold the assembly tightly together.

Connected to at least one end of the chamber 2 and preferably to opposite ends thereof are outlet conduits 12 which extend from the ends of chamber 2 to a heat exchanger 15 in which heat energy can be extracted from a medium passing through the conduits 12. The heat energy can be utilized directly, or delivered to a conventional thermodynamic apparatus 16 which converts it into mechanical energy. This in turn can be converted into electrical energy by a generator 17 or the like.

Connected to the other side of the heat exchanger is a compressor 18, the outlet of which is connected to the inlet side of pump P and to conduits 25. At a convenient place in the circuit between the heat exchanger 15 and the compressor 18 a conditioning apparatus can be placed in which a working medium is subjected to a conditioning process so that undesired impurities, such as metal vapors and reaction products, can be removed from a working medium.

The cross sections of the inlet passage 11, the chamber 20, the annular nozzle 5 and the chamber 2 are chosen in such a manner that a substantial part of the pressure provided by the pump P is effective at the annular nozzle 5. The work performed by the pump is therefore available to a large extent in the form of kinetic energy of the working medium issuing from the annular nozzle. The radial inwardly directed velocity V of the working medium issuing from the annular nozzle may be calculated from the hydrodynamic laws approximately as follows:

$$V \approx \sqrt{2 \cdot p / \delta} \quad (1)$$

where $p$ is the pressure and $\delta$ is the density of the working medium.

Connected between the power source 22 and a common ground 21a for the annular member 6 are voltage control impedences 24. Conductors 30 are connected between the halves of the chamber 2 and ground.

The embodiment of the apparatus shown in FIG. 3 is somewhat simpler in its construction than that of FIGS. 1 and 2, the cylindrical electrodes 3 and 4 having contacts 3b and 4b extending only from one point on the peripheries thereof through the wall of the chamber 2. Insulating rings 23a are cylindrical in shape and are positioned between the cylindrical electrodes 3 and 4 and the wall of the chamber 2. The flanges 2a on the parts of the chamber 2 abut the annular member 6 directly, and the contacts 3b and 4b are insulated from the chamber wall by extensions of the insulating rings 23a. The branch conduits for conducting the working medium around the electrodes are omitted in this embodiment.

Figure 4:
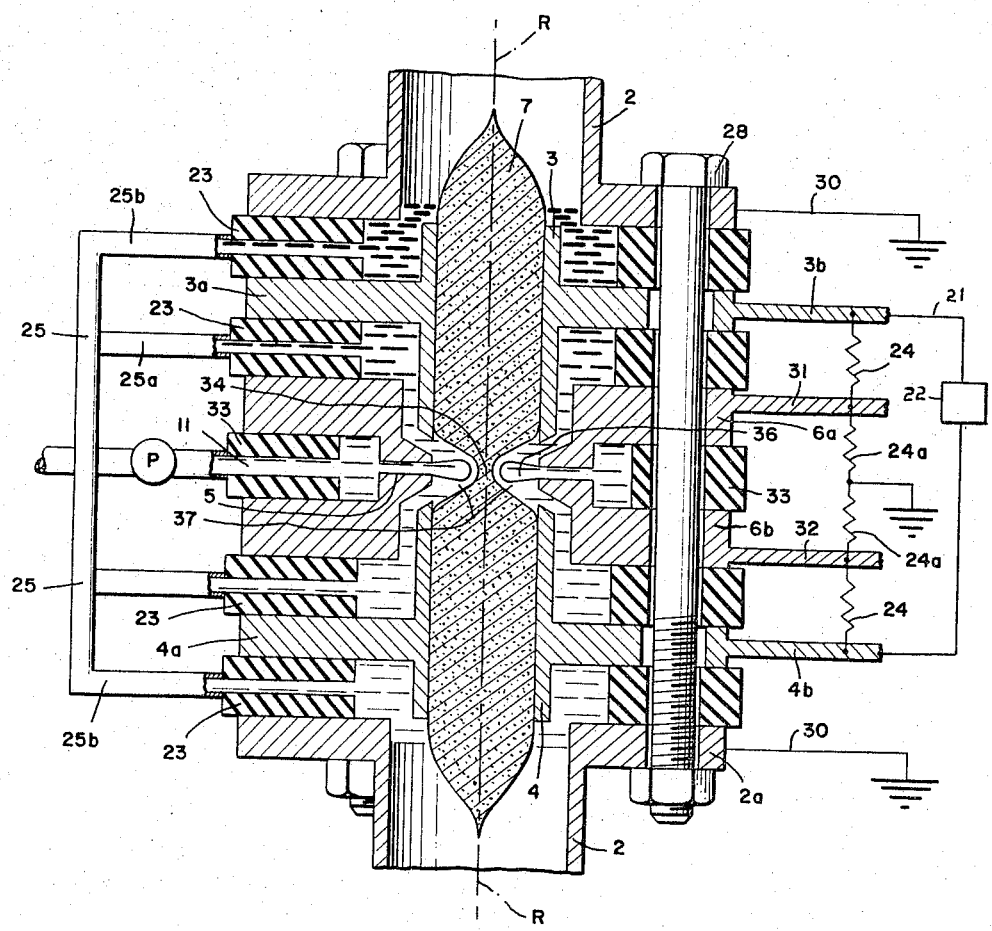
FIG. 4 is a view similar to that of FIG. 1 showing a modified embodiment of the apparatus of the present invention.

The embodiment of the apparatus shown in FIG. 4 is somewhat more complex in its construction than that of FIGS. 1 and 2. The annular member is divided into two spaced halves which are substantially mirror symmetrical to a plane which is perpendicular to the axis R—R and midway between the electrodes 3 and 4. The halves of the annular member define the annular nozzle 5 between them and are recessed to define between them the annular chamber 20 from which the annular nozzle opens radially inwardly of the annular member. The halves of the annular members are insulated from each other by an annular insulating member 33 through which the passageway 11 is formed.

As in the embodiment of FIGS. 1 and 2, the power source 22 is connected by conductors 21 to the contacts 3b and 4b on the extensions of the electrodes 3 and 4, and the walls of the chamber 2 are grounded by grounding conductors 30. However, the contacts 3b and 4b are coupled to contacts 31 and 32 on the halves 6a and 6b of the annular member through voltage impedance 24, and the contacts 31 and 32 are grounded through voltage impedances 24a. Otherwise, the construction of this embodiment is the same as that of FIGS. 1 and 2.

In operation, a working medium containing a substance which is capable of fusion, such as deuterium or tritium, or a mixture thereof, is introduced into the pressure chamber 2 at a pressure above atmospheric and the voltage impressed on the electrodes 3 and 4 to produce an arc 7, and the electrode voltage is adjusted to give a voltage drop which is very high through the constriction formed at the nozzle 5. It is not essential to have a voltage impressed on the annular member 6 itself, and this is not done in the embodiments of FIGS. 1 and 2, and FIG. 3. In such a case, annular member 6 can be made of a non-conductive material, such as aluminum oxide. However, at high arc intensities, it is preferred to apply a voltage to the member 6, as in the embodiment of FIG. 4. Since the voltages necessary to produce high arc intensities are also high, there is a danger of an electrical discharge between the parts of the apparatus. It is advantageous to give both halves of annular member 6 predetermined electric potentials so as to avoid the possibility of such a discharge. This is possible since the nozzle is made from an electrically conducting material. The manner in which the potentials should be chosen can be illustrated if the potential applied between electrodes 3 and 4 is to be e.g. 2000 volts. This potential is distributed over the entire length of the electric arc between the two electrodes. Three sections may be considered to exist, section A which encompasses the length of the electric arc from the electrode 3 to one-half 6a of the annular member, section B which encompasses the constriction in the annular member 6, and section C which encompasses the length of the electric arc from the other half 6b of the annular member to the electrode 4. The total potential of 2000 volts is not distributed evenly over the three sections. The section B has the greatest potential drop as a result of the constriction in the plasma arc. In the present example, the potential drop in section B may amount to 1000 volts and that in the sections A and C to 500 volts. The potentials of the various parts of the equipment, which are insulated from each other, can be chosen as follows:

Both halves of the chamber 2 are connected to ground (zero potential). The electrode 3 is given a −1000 volt potential. The one-half of the nozzle 6a nearest electrode 3 is given a −500 volt potential, and the other half 6b of the nozzle a +500 volt potential. Finally, the electrode 4 is given a potential of +1000 volts. The potential difference between each nozzle portion and the adjacent electrode therefore amounts to 500 volts and the potential difference between the nozzle halves themselves amounts to 1000 volts. Since the parts of the chamber 2 are then kept at ground potential the potential difference between the parts of the chamber 2 and the adjacent electrodes will be 1000 volts.

Thereafter the reaction medium is fed from the compressor 18 and pump P through the passageway 11 into annular chamber 20 and through nozzle 5 as an annular jet 36 flowing radially inwardly with respect to axis R—R at a pressure higher than that prevailing at the ends of the pressure chamber 2 where reaction medium is flowing out of the pressure chamber, so that a pressure gradient is established between the constriction at the center of the annular member 6 and the ends of the pressure chamber. As seen in FIG. 3, the plasma column 7 lies in the electric arc, between the electrodes 3 and 4. The cool working medium is fed through the passages 11 to the chamber 20 and then to the nozzle 5 arranged around the axis R—R and on both sides of the plane 2—2, the nozzle serving to bring the cool working medium up to the surface of the plasma column. The cooling effect and the velocity of the medium causes the plasma to be constricted at 34 and to have its narrowest section in the plane 2—2. The other regions of the plasma column are cooled to a decreasing extent as their distance from the plane 2—2 increases, so that the diameter increases accordingly.

To the pressure at which the working medium enters the space enclosed by the annular member 6 there is also to be added to the pressure within the plasma the magnetic pressure, which is exerted upon the electrically charged plasma particles by the circular magnetic field of the arc current. This magnetic pressure depends on the diameter of the current-carrying plasma column and also on the current intensity of the arc, and may be a multiple of the pressure of the working medium which is fed. Since outside of the annular member 6 the diameter of the plasma column, due to the absence of the cooling effect and the velocity-pressure effect of the inflowing working medium, is greater than in the annular member 6, the magnetic pressure is therefore lower than in the constricted zone of the plasma column. A magnetic pressure gradient is therefore set up from the narrowest region of the plasma column in both axial directions. This pressure gradient and the pressure gradient due to the feed of the working medium under pressure causes the plasma to flow away from the narrowest region of the constriction toward the electrodes. This flow is indicated by the arrows 35. Should the plasma flowing away from the constriction not be replaced, the diameter of the constriction would decrease continuously, so that the electric arc would finally be interrupted (so-called pinch instability). In the present process, cutting off does not occur in this manner, because the working medium 36, which is fed to the plasma column in the liquid state in the present case will be vaporized due to the effect of heat as soon as it comes into contact with the surface of the plasma column. A gaseous transition zone 37 will thus be formed between the working medium 36 which is still liquid and the plasma column. On coming into contact with the surface of the plasma column, the temperature of the gas will further rise, so that it will be ionized and transformed into plasma which is conducting. The medium will then flow outwardly in an essentially axial direction, i.e., in the direction required by the pressure gradient and the flow of medium in the apparatus. The plasma flowing away will thus be continuously replaced by the newly formed plasma, so that the diameter of the constriction remains constant. A part of the cool working medium thus moves radially onto the surface of the plasma column, is there transformed into plasma, thereupon moves along the axis under the influence of the electromagnetic field and is finally pushed by the magnetic pressure gradient towards the electrodes.

A stable condition is thereby brought about, in which the radius of the column at the contracted zone becomes neither greater nor smaller. This means that the pinch remains stable. The magnetic pressure in the plasma column is balanced in the axial direction by the force to be applied in accelerating the plasma and by the flow resistance encounted by the latter in the magnetic field.

The joulean heat liberated within the constriction will be utilized mainly for the formation of new plasma, the heat losses due to conduction and radiation being of secondary importance.

The working medium which is introduced into the chamber 2 through branch conduits 25a and 25b in the embodiments of FIGS. 1, 2 and 4 has first the object of cooling the electrodes 3 and 4 and thereby keeping the temperature thereof below a critical limit (i.e., below the melting temperature of the electrode materials used), thereby reducing the losses occurring due to volatilisation of the material of the electrodes caused by contact with the hot plasma. Secondly, the additional working medium which is introduced into the space between the electrodes and the annular member 6 and into the space between the electrodes and the chamber 2 serves to provide a zone free of plasma, so that the electrical insulation between the said parts is protected from deterioration due to contact with the plasma.

The diameter of the constriction 34 of the plasma column will be determined by two oppositely acting factors. The plasma column will tend to increase the diameter of the constriction by radial heat conduction, the working medium brought into it by the radially inwardly directed nozzle 5 being heated up and transformed into plasma. The speed of this heating-up operation will, for a given current intensity of the electric arc, increase with decreasing diameter of the constriction; that is when the current density and therefore the electrical power density increases, the temperature within the constriction rises. The heating-up operation will therefore take place in an outward direction with a velocity $w(r)$ which is a function of the radius of the constriction. Secondly, the radial delivery of the cool working medium in an inward direction, causes the radius of the constriction to be decreased. This decrease occurs with a velocity $v$ (Equation 1). The superposition of those two oppositely acting effects leads to a stationary condition of the constriction. This stationary condition is characterized by the fact that the outwardly directed velocity $w(r)$ is equal to the inwardly directed velocity $v$ of the working medium. By increasing the velocity $v$ of the working medium, the diameter of the plasma channel at the point of constriction may therefore be decreased. According to Equation 1 the radial velocity $v$ may be increased by increasing the injection pressure $p$. There are no basic limitations to this action, so that the diameter of the constriction may be brought down to very small values, and in the limiting case can approach 0, by expending a sufficient amount of energy. In this manner the current density within the constriction may be increased to a very high value. An increase in the current density, however, also means an increase in the power density and the temperature within the constriction will therefore also have to increase. It therefore seems possible, by making a suitable choice of working medium, of the electric arc current I and of the injection pressure $p$ of the working medium to obtain conditions at the narrowest section of the constriction of the plasma channel, at which nuclear reactions occur, thus providing usable energy.

Experiments have already been carried out which show that the proposed process is feasible.

*Example 1*

The experimental apparatus corresponded essentially to that shown in FIGURE 3 and had the following dimensions: the inside diameter of the annular member 6 was 8 mm. and the width of the annular nozzle in the axial direction R—R thereof was 0.05 mm. The diameter of the delivery passageway 11 was 5 mm. The distance between the oppositely arranged ends of the electrodes 3 and 4 was 20 mm. The generator 22 provided a potential drop between the electrodes of approximately 600 volts and a potential drop within the constriction having a length of approximately 0.5 mm. of roughly 500 volts. The working medium consisted of pure water.

An electric arc was formed between the electrodes and the working medium was simultaneously directed thereupon through the passageway 11 into the annular chamber 20 and from there through the annular nozzle 5 at a pressure of 100 kg./cm.$^2$, to the electric arc at a delivery rate of 100 grams/sec. At an electric arc current intensity of 16,000 amperes, a minimum diameter of the constriction of approximately 0.2 mm. was obtained for a period of 0.01 sec. This corresponds to an average current density in the plasma channel within the narrowest part of the constriction amounting to $5.2 \cdot 10^7$ amperes/cm.$^2$. The electric arc power thus amounted to 500 volts $\times$ 16,000 amperes = $8 \cdot 10^6$ watts. This corresponds to a specific power of $5.1 \times 10^{17}$ watts/cm.$^3$. The temperature within the constriction was definitely higher than 200,000° K. The pressure exerted by the magnetic field of the electric arc current within the construction was calculated to be $4 \times 10^3$ kg./cm.$^2$.

These experimental results show that the process of the present invention produces unusually high compressions and temperatures of the plasma. This process therefore represents a considerable advance as compared to known processes.

*Example 2*

The same apparatus can be used to carry out the process under the following conditions:

Current density of the electric arc ----- at least 100,000 amperes.
Working medium ----------------- Hydrogen.
Flow rate of the working medium ----- 100 g./s.
Injection pressure of the working medium ------------------- Up to 1000 kg./cm.$^2$.

In view of past experience, it may be expected that the diameter of the constriction of the plasma channel will be stabilized at less than 0.1 mm. and that the temperature within the constriction will rise to more than $10^7$ ° K. The magnetic pressure will then amount to roughly $6 \cdot 10^5$ kg./cm.$^2$.

Other reactive working mediums can be used. The following are of particular importance:

Pure deuterium ($D_2$)
A mixture of deuterium ($D_2$) and tritium ($T_2$) in equal parts
Heavy water ($D_2O$)
A mixture of heavy water ($D_2O$) and trigiated water ($T_2O$) in equal parts.

The electric arc current I, the injection pressure $p$ and the flow rate per second of the working medium can also be increased above the values indicated in Example 2, by providing adequate means therefore. The limitations in the examples were set by the technical means available at the time of the experiments.

The further question now arises whether in applying this method more energy can be gained than must be put in for maintaining the process. The following considerations of principle may serve as an answer for this question:

Upon the occurrence of nuclear fusion, the energy released by mass loss per unit volume and unit time is given by the expression:

$$P_F = C_3 \cdot n_i^2 \cdot \overline{\sigma V} \cdot A \qquad (14)$$

wherein $\overline{\sigma V}$ expresses the probability of reaction and A is the amount of energy released per reaction in the form of kinetic energy of the elementary particles reacting with each other. The values $\overline{\sigma V}$ and A depend on the working medium which is employed and can be determined theoretically or experimentally with great accuracy. $C_3$ is a constant factor, the magnitude of which depends on the nature of the working medium and which can be accurately calculated in each case.

When the expression (14) is applied to the plasma column produced by means of the method according to the invention and having a radius $r_K$ and a temperature $T_i$, then the following expression is obtained for the energy $P_F$ released per unit length and unit time:

$$P_F = C_3 \cdot \frac{\mu_0^2}{256 \pi^3 \cdot k^2} \cdot \frac{I^4 \cdot \overline{\sigma V} \cdot A}{r_K^2 \cdot T_i^2} \qquad (15)$$

wherein the particle number $n_i$ in Equation 14 is replaced by the equation $$n_i = \frac{\mu_0}{16 \pi^2 \cdot k} \cdot \frac{I^2}{r_K^2 \cdot T_i} \qquad (8)$$

When the expression (15) for the nuclear fusion power is compared with the expression for the arc power and for this purpose the ratio $$P_F/P_L = \frac{C_3}{C_1} \cdot \frac{\mu_0^2}{256 \cdot \pi^2 \cdot k^2} \cdot \frac{I^2 \cdot \overline{\sigma V} \cdot A}{T_i^{1/2}} \qquad (16)$$

is formed, it is seen that (1) The ratio $P_F/P_L$ is independent of the radius of the plasma duct,
(2) The ratio $P_F/P_L$ increases as the square of the current,
(3) The ratio depends on the value of the temperature dependent term $\overline{\sigma V}/T_i^{1/2}$.

In the following Table I there are indicated for a deuterium-tritium reaction the calculated values of $\overline{\sigma V}/T_i^{1/2}$ and $P_F/P_L$ for a current of 500,000 amps:

TABLE I

| $T_i$ | $(\overline{\sigma V})/T_i^{1/2}$ | $P_F/P_L$ |
| --- | --- | --- |
| $20 \cdot 10^6$ ° K | $10^{-28}$ m.$^3$/s., ° K | 0.05 |
| 50 | $10^{-27}$ | 0.5 |
| 100 | $10^{-26}$ | 5 |

From this table it is evident that in principle it will be possible for instance by the use of deuterium and tritium as a working medium to obtain a power gain resulting from nuclear fusion, which is greater than the power in the form of arc energy which is required for maintaining the magnetic field. The excess of power is so great that it is also possible to cover additional and unforeseen losses such as e.g. the cyclotron radiation or energy losses caused by the migration neutrons released during the fusion process, which neutrons are not retained by the magnetic field, and other losses caused by the unavoidable defects of the method. As soon as the reaction has ignited, the losses are mainly covered by the gain in energy through nuclear fusion. Thus the possibility exists of increasing the power of the reactor by an increase in current and particularly to improve the power gain relative to the power necessary for maintaining the magnetic field. Broadly, according to the invention the power of the reactor can be controlled by changing the current intensity, which fact represents a particular advantage of the method, since the control can be effected practically without inertia in the control system.

According to the invention, control of the power of the reactor can also be effected by changing the pressure $p$ at which the reaction medium is fed to the arc, as indicated above.

Furthermore the question arises whether the application of the method would be dangerous for the neighborhood, possibly in that the reaction, once initiated, could become uncontrolled and lead to an explosion of the reactor. Such an event, however, is not to be feared, as seen by the following: The production of energy decreases according to Equation 15 proportional to $T_i^2$, since $\overline{\sigma V}$ must be considered practically as a constant at the involved temperatures of about $10^8$ °K. and higher. On the other hand, however, the losses caused by the discharge of plasma in both axial directions increase in linear proportion to the temperature $T_i$, so that with a given current I and a given pressure $p_a$ of the working medium the temperature adjusts itself to a stable value (steady state reaction temperature) in which energy production and energy loss are equal.

A special problem arises in the utilization of the energy released by nuclear fusion. This energy appears in the form of two symmetrical parts of the plasma column of high kinetic energy, which issue from the annular member in opposite directions along the axis between the electrodes. The column is enclosed by a circular magnetic field. These parts of the plasma column deliver their energy to the atoms of the cooler gas masses located in the expansion chamber 2 outside of the annular member 6, whereby said gas is heated. The heated gas is discharged through the conduits 12 and continuously replaced by the gas masses which flow past the actual constricted zone of the plasma column through the two axial openings of the annular member 6. Cool masses of gas and liquid, respectively, which consist of the working medium can be introduced into the expansion chamber outside of the annular member through the branch conduits 25b provided for this purpose. According to the invention this protects the walls of the expansion chamber against the effect of the hot gases.

The heated gases can be fed to a heat exchanger 15 in which the thermal energy is transmitted to another working medium. The thermal energy, according to requirements, can then be utilized directly or converted in a thermodynamic machine of conventional design 16 into mechanical energy and then by means of a generator 17 into electrical energy. The working medium can in this case pass in an open or closed circuit.

An additional possibility exists to use the working medium without using a heat exchanger, i.e. it is directly employed.

After the thermal energy of the working medium has been utilized in one of the apparatus previously described, whereby it is cooled, the working medium can be delivered to a compressor 18, wherein it is brought to the required pressure, and thereupon returned again to the annular member 6 so that it completes a closed circuit.

However, the working medium, after its thermal energy has been utilized, can also be liquefied by cooling and afterwards compressed and delivered to the reaction nozzle in a closed circuit.

At any point in the circuit of the working medium there can be inserted a device 19 which is entirely or partly traversed by the flow of working medium and in which the working medium is subjected to a conditioning process so that undesirable impurities, such as metal vapors and reaction products, can be removed therefrom.

A further possibility of utilizing the energy gained by nuclear fusion and appearing in the form of kinetic energy of the plasma column, consists in splitting each of the oppositely directed parts into an ion beam and an electron beam by means of magnetic fields extending at right angles to the direction of the beams, and in directing the beams thus separated against electric fields, whereby the kinetic energy is directly converted into electrical energy.

As evident from the above explanations, the energy required for igniting the reaction must be supplied to the plasma column in the form of arc energy. After completion of ignition a further supply of energy should not be necessary any more, but in order to maintain the reaction the circular magnetic field must be present which produces the required pressure in the plasma column. The current flow in the arc must therefore be maintained even after the process has been ignited, which fact causes a particular problem, because it is not possible to bring the plasma column parts issuing from both openings of the annular member directly into contact with metal electrodes, since the latter would be instantaneously vaporized at the point of contact. The plasma column parts are therefore preferably surrounded by tubular electrodes 3 and 4 so that the inflow and outflow of the electric current, which is practically completely carried by electrons, can be radially effected from the inner electrode surface to the plasma column.

The electrodes can be provided with a coating on the side facing the arc or they can consist of a material requiring only little energy for the liberation of electrons, so that the energy consumption at the electrodes themselves is kept as low as possible. According to the invention the working medium itself can be used as coolant, which subsequently can be fed into the expansion chamber around the ends of the electrodes.

Moreover, the expansion vessel according to the invention can be formed so that portions of its wall simultaneously serve as electrodes.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. An apparatus for compressing and heating a plasma, comprising two electrodes spaced from each other along an axis, power supply means coupled to said electrodes for establishing and maintaining an electric arc between said electrodes, an annular member mounted between said electrodes with the axis of the annular member coinciding with the axis between said electrodes and said annular member being perpendicular to said axis and surrounding only a part of the length of said axis between said electrodes, said annular member having an annular inlet opening on the inner periphery thereof opening into the center of said annular member in a radial direction, and means for delivering cool working medium through said inlet opening into the interior of said annular member.

2. An apparatus as claimed in claim 1 in which the annular member consists of two spaced annular halves, said two halves being mirror symmetrical to each other with respect to a medial plane perpendicular to said axis and being of conductive material and defining an annular nozzle between them, an annular insulating piece between said two halves adjacent the outer peripheral surface thereof for electrically insulating said halves with respect to each other, said halves also being insulated with respect to said electrodes, and means coupled to said halves and to said power supply for controlling the electrical potentials of said two halves relative to the electrodes and each other.

3. An apparatus for compressing and heating a plasma, comprising a pressure resistance chamber, two electrodes mounted in said chamber and spaced from each other along an axis and electrically insulated from said chamber, power supply means coupled to said electrodes for establishing and maintaining an electrical arc between said electrodes within said chamber, an annular member mounted in said chamber midway between said electrodes and having an axis coinciding with the axis between said electrodes, said annular member being perpendicular to the axis between the electrodes and surrounding only a part of the length of said axis between said electrodes and being mirror symmetrical with respect to a medial plane through said axis between said electrodes, said annular member having an annular inlet opening out of the inner periphery of said annular member into the center thereof in a radial direction with respect to said axis, means connected to said annular member for delivering cool reaction medium through said inlet opening, and at least one outlet conduit connected to said chamber for conducting media out of said chamber.

4. An apparatus for compressing and heating a plasma, comprising a pressure resistance chamber, two coaxial cylindrical electrodes mounted in said chamber and spaced from each other along an axis and electrically insulated from said chamber, power supply means connected to said electrodes for establishing and maintaining an electrical arc between said electrodes, said chamber being in two halves symmetrical with respect to a medial plane between said two electrodes perpendicular to the axis between said electrodes, said chamber halves having walls which are electrically insulated with respect to each other and said electrodes, an annular member between said two halves of said chamber with the axis thereof coinciding with said axis between said electrodes, electrical insulation between said chamber halves and said annular member, said annular member surrounding only a part of the length of said axis between said electrodes and being perpendicular with respect to said axis and of substantially mirror symmetry with respect to said medial plane, said annular member being of conductive material and having two spaced halves which are mirror symmetrically located with respect to said medial plane and define a radially inwardly directed annular inlet opening, electrical insulation between said two halves of said annular member adjacent the outer periphery thereof, and said annular member halves being insulated with respect to said electrodes, potential control means coupled to said power supply, said chamber halves and to said annular member halves for controlling the electrical potential, thereof, said annular inlet opening defined between the halves of said annular member being directed in a radial direction with respect to said axis, means connected to said annular member for delivering cool working medium through said inlet opening, and at least one outlet conduit connected to each of the chamber halves for conducting media out of said chamber.

5. An apparatus as claimed in claim 4 further comprising branch conduits extending from said means for feeding working medium to said annular member, said branch conduits opening into said chamber adjacent the outer surface of said electrodes for feeding cool working medium to the outer surface of said electrodes.

References Cited by the Examiner
UNITED STATES PATENTS

| | | | |
|---|---|---|---|
| Re. 25,088 | 11/1961 | Ducati et al. | 219—121 |
| 1,073,870 | 9/1913 | Siebert | 204—323 X |
| 2,819,423 | 1/1958 | Clark. | |
| 2,906,858 | 9/1959 | Morton | 219—121 |
| 3,031,396 | 4/1962 | Anderson | 176—8 |
| 3,042,830 | 7/1962 | Orbach | 313—231 |

OTHER REFERENCES

Maecker: Zeitschrift für Physik, vol. 129, pp. 109–112, 116, 117.

REUBEN EPSTEIN, *Primary Examiner.*